(12) United States Patent
Shochet et al.

(10) Patent No.: US 8,966,250 B2
(45) Date of Patent: Feb. 24, 2015

(54) APPLIANCE, SYSTEM, METHOD AND CORRESPONDING SOFTWARE COMPONENTS FOR ENCRYPTING AND PROCESSING DATA

(75) Inventors: Ofer Shochet, Tel Aviv (IL); David Movshovitz, Raanana (IL)

(73) Assignee: salesforce.com, inc., San Francisco, CA (US)

( * ) Notice: Subject to any disclaimer, the term of this patent is extended or adjusted under 35 U.S.C. 154(b) by 759 days.

(21) Appl. No.: 13/062,696

(22) PCT Filed: Sep. 8, 2009

(86) PCT No.: PCT/IB2009/053924
§ 371 (c)(1),
(2), (4) Date: Apr. 23, 2012

(87) PCT Pub. No.: WO2010/026561
PCT Pub. Date: Mar. 11, 2010

(65) Prior Publication Data
US 2013/0067225 A1    Mar. 14, 2013

Related U.S. Application Data

(60) Provisional application No. 61/094,985, filed on Sep. 8, 2008.

(51) Int. Cl.
*H04L 29/06* (2006.01)
*H04K 1/00* (2006.01)
*G06F 21/62* (2013.01)
*H04L 9/06* (2006.01)

(52) U.S. Cl.
CPC ........ *H04L 63/0471* (2013.01); *G06F 21/6209* (2013.01); *H04L 9/0662* (2013.01); *H04L 63/105* (2013.01); *H04L 2209/56* (2013.01)
USPC ............................................ 713/165; 380/28

(58) Field of Classification Search
CPC ......... H04L 9/0618; H04L 9/065; H04L 9/28; G06F 21/6254
USPC .......................................................... 713/165
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |

(Continued)

FOREIGN PATENT DOCUMENTS

| JP | 1993244150 | 9/1993 |
| JP | 2007287102 | 11/2007 |

OTHER PUBLICATIONS

Hacigumus et al. Search on Encrypted Data. May 19, 2007. pp. 1-48.*

(Continued)

*Primary Examiner* — Dede Zecher
*Assistant Examiner* — Abdullah Almamun
(74) *Attorney, Agent, or Firm* — Blakely, Sokoloff, Taylor & Zafman

(57) ABSTRACT

Disclosed is an appliance, system, method and corresponding software application for encrypting and processing data. A symbol based encryption module may be adapted to encrypt data on a symbol basis such that some or all of the encrypted data remains processable.

28 Claims, 6 Drawing Sheets

(56) References Cited

U.S. PATENT DOCUMENTS

| | | | |
|---|---|---|---|
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,035,040 A * | 3/2000 | Mann et al. | 380/28 |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson et al. | |
| 8,347,101 B2 * | 1/2013 | Wilson | 713/180 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0073099 A1 * | 6/2002 | Gilbert et al. | 707/104.1 |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0165623 A1 * | 7/2005 | Landi et al. | 705/2 |
| 2006/0077100 A1 * | 4/2006 | Dahms et al. | 342/457 |
| 2006/0242407 A1 * | 10/2006 | Kimmel et al. | 713/166 |
| 2006/0251246 A1 * | 11/2006 | Matsui | 380/28 |
| 2006/0294373 A1 * | 12/2006 | Stamos et al. | 713/165 |
| 2007/0282783 A1 * | 12/2007 | Singh | 707/1 |
| 2010/0023750 A1 * | 1/2010 | Tan | 713/150 |
| 2011/0314276 A1 * | 12/2011 | Ogram et al. | 713/165 |

OTHER PUBLICATIONS

Eu-Jin Goh. Secure Indexes. Mar. 16, 2004. pp. 1-18.*

Song et al. Practical Techniques for Searches on Encrypted Data. 2000. IEEE. pp. 1-12.*

Office Action for Japanese Application No. 2011-525675 Mailed Oct. 29, 2013, 7 pages.

Yoshinobu Samejima, "Information Leakage Prevention Techniques for Protecting Privacy of Enterprise Information Systems," Hitach reviewal, vol. 90, No. 3, p. 84-89, Mar. 1, 2008, Japan.

First Examination Report for Australian Patent Application No. 2009288767 mailed Jun. 27, 2014, 3 pages.

* cited by examiner

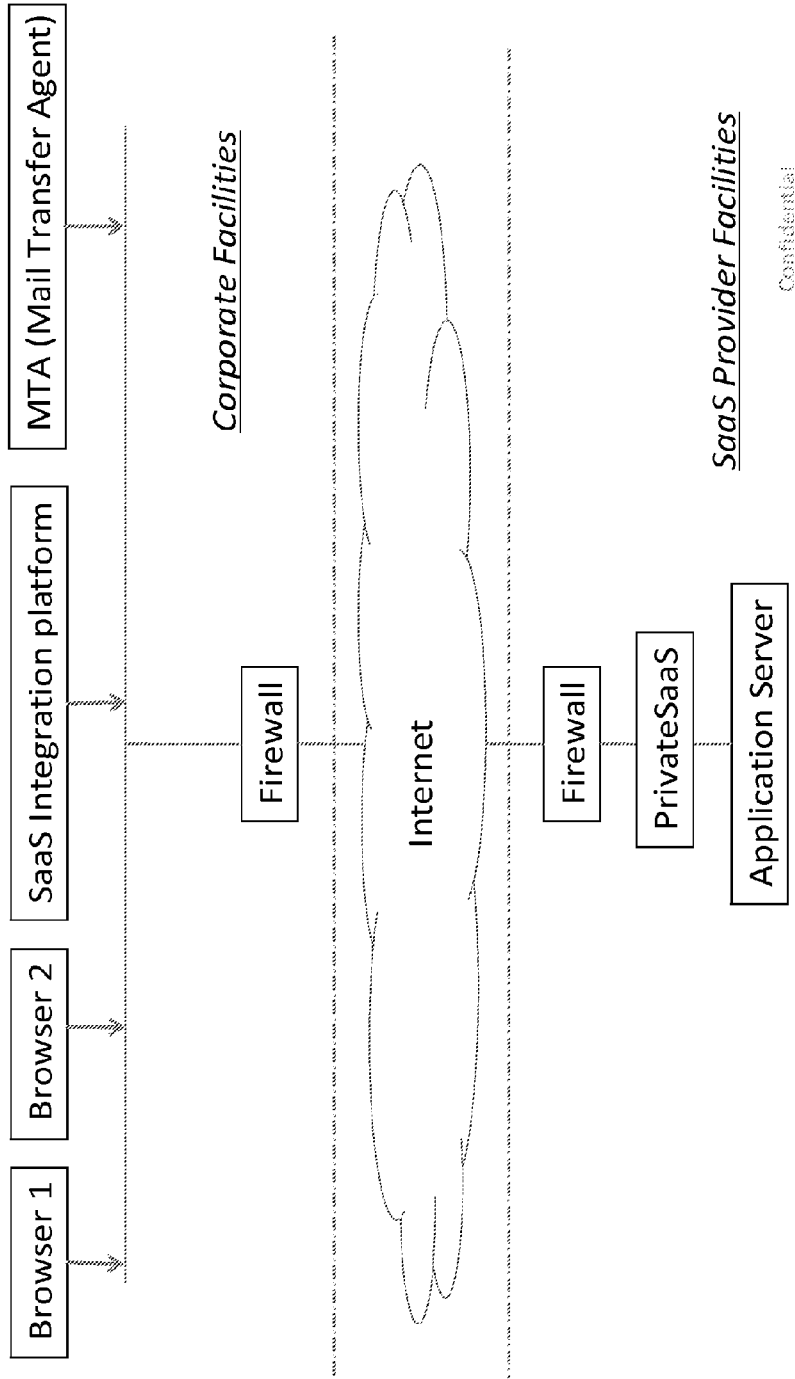

APPLIANCE, SYSTEM, METHOD AND CORRESPONDING SOFTWARE COMPONENTS FOR ENCRYPTING AND PROCESSING DATA

CLAIM OF PRIORITY

This application is related to, and claims priority to, U.S. National Phase application under 35 U.S.C. §371 of International Application No. PCT/IB09/53924, filed Sep. 8, 2009, and is further related to, and claims priority to, U.S. Provisional Patent Application No. 61/094,985, filed Sep. 8, 2008, the entire contents of which are incorporated herein by reference.

FIELD OF THE INVENTION

The present invention generally relates to the field of Data Encryption. More specifically, the present invention relates to An Appliance, System, Method and Corresponding Software Components for Encrypting and Processing Data. More specifically, the present invention is related to encrypting data in a format that allows for external authorized applications to perform certain processing on the encrypted data—for example searching for content within the encrypted data as well as to index data for search.

BACKGROUND

Currently there are no known solutions that enable processing (e.g. indexing and searching) of encrypted data, and encryption is usually on the data being stored to a storage area or on information transmitted between two parties. In both cases before the data is process by the application it must be decrypted.

All known solutions to secure data sent to a SaaS application include securing the pipe between the user (end-user or the enterprise network) and the service, and relying on the security provided by the Software as a Service (SaaS) vendor. However, the SaaS user does not control his sensitive data, and in cases where there is leakage of information from the SaaS provider, the user's confidential data is exposed.

There is the option of standard encryption of the data before it is sent to the external repository. However, standard encryption solutions do not allow for processing of the data content as part of standard operations like searching, calculations and comparison.

There exists a need in the field of data encryption and processing for improved method and systems for data encryption and processing.

SUMMARY OF THE INVENTION

The present invention is an appliance, a system, a method and corresponding software components for encrypting and processing data. According to some embodiments of the present invention, there may be provided a symbol based encryption module to encrypt on a per symbol basis some or all of the data within a data file, data record, transaction (e.g. HTTP, HTTPS, SMTP, IMAP, POP3, or WAP request) or document. The encryption may be invariant on a per symbol basis and at least some of the data in the file or document may remain searchable and otherwise processable. The encryption module may utilize either a symbol based mapping table or a symbol based encryption algorithm. The mapping table or an encryption key of the algorithm may be either user or organization specific. The encryption algorithm may utilize a user or organizational specific key provided by the user.

According to further embodiments of the present invention, encryption of a symbol or a group of symbols may be selective and based on a sensitivity evaluation of the symbol (s). A data sensitivity evaluation module may be provided, and the module may determine a sensitivity level of some or all symbols or groups of symbols within the data file, record, transaction or document. The sensitivity classification of symbols may be performed based on one or more parameters selected from the group consisting of symbol title, symbol data format, symbol content, and a user selected security level.

According to some embodiments of the present invention, the encryption module may be integral or otherwise functionally associated with an application adapted to generate, view or edit the data file, record, transaction or document.

According to further embodiments of the present invention, the encryption module may be integral or otherwise functionally associated peripheral hardware connected to a computational platform of an application adapted to generate, view or edit the data file, record, transaction or document.

The encryption module may be integral or otherwise functionally associated with an organizational data file system, data record repository or document repository.

The encryption module may be integral or otherwise functionally associated with a gateway to an extra-organizational file system, data record repository or document repository.

The encryption module may be integral or otherwise functionally associated with an application provided by a Software as a Service server or with a gateway to a Software as a Service application server. Features of the encryption process, including which tables or algorithm keys to use may and who symbols to select for encryption, may depend of the specific application.

According to some embodiments of the present invention, there may be provided a symbol based decryption module adapted to utilize a mapping table or a decryption algorithm associated with the table or algorithm used for encryption by said encryption module. The term associated may mean either the same or the inverse of the table or the algorithm. The decryption module may detect the encryption symbols in the response returned and decrypt these symbols.

The decryption module may be integral or otherwise functionally associated with an application adapted to generate, view or edit the data file, record file, record, transaction or document.

The decryption module may be integral or otherwise functionally associated peripheral hardware connected to a computational platform of an application adapted to generate, view or edit the data file, record, record file, transaction or document.

The decryption module may be integral or otherwise functionally associated with an organizational data file system, record repository or document repository.

The decryption module may be integral or otherwise functionally associated with a gateway to an extra-organizational data file system, record repository or document repository.

The decryption module may be integral or otherwise functionally associated with an application provided by Software as a Service server or with a gateway to a Software as a Service application server.

According to further embodiments of the present invention, the encryption module may be adapted to encrypt at least a portion of one or more fields of a data file, record, transaction or document stored to a relational database. One or more relational database processes, such as searching or indexing, may be performed on both encrypted and unencrypted portions of the fields. According to further embodiments of the present invention, there may be provided a search engine/utility adapted to search one or more encrypted files, records, record files, transactions or documents by converting search terms into encrypted versions of the search terms. According to some embodiments of the present invention, the encryption and decryption of field data may be transparent to the relational database.

A data processing module may be adapted to read and process both encrypted and unencrypted data from at least a portion of one or more data files, records, transactions or documents encrypted by the encryption module and stored on a relational database. The data processing module may also be adapted to read and process encrypted data from at least a portion of each of one or more data fields encrypted by the encryption module and stored on a relational database.

According to some embodiments of the present invention, the encryption module may be adapted to encrypt an HTTP, HTTPS, SMTP, IMAP, POP3, or WAP request, which request may be an HTTP, HTTPS, SMTP, IMAP, POP3, or WAP related transaction.

According to some embodiments of the present invention, there may be provided a data processing system including a symbol based encryption module adapted to encrypt on a per symbol basis some or all of the data within a data record, data file or document, wherein the encryption is invariant on a per symbol basis and at least some of the data in the file or document remains processable, and wherein letter case format information is encoded on the encrypted data. Symbols to be encrypted may first be converted into lower case letters, encrypted, and then case format information relating to the unencrypted symbols may be encoded onto the encrypted data. A decryption module may read case format inffrom the encrypted symbols, decrypt the encrypted symbols back into lower case decrypted symbols and apply the case format information to the decrypted symbols.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 2 to 6 are block diagrams showing various exemplary encryption/decryption module arrangements within various data generation and storage chains;

Figure 1:
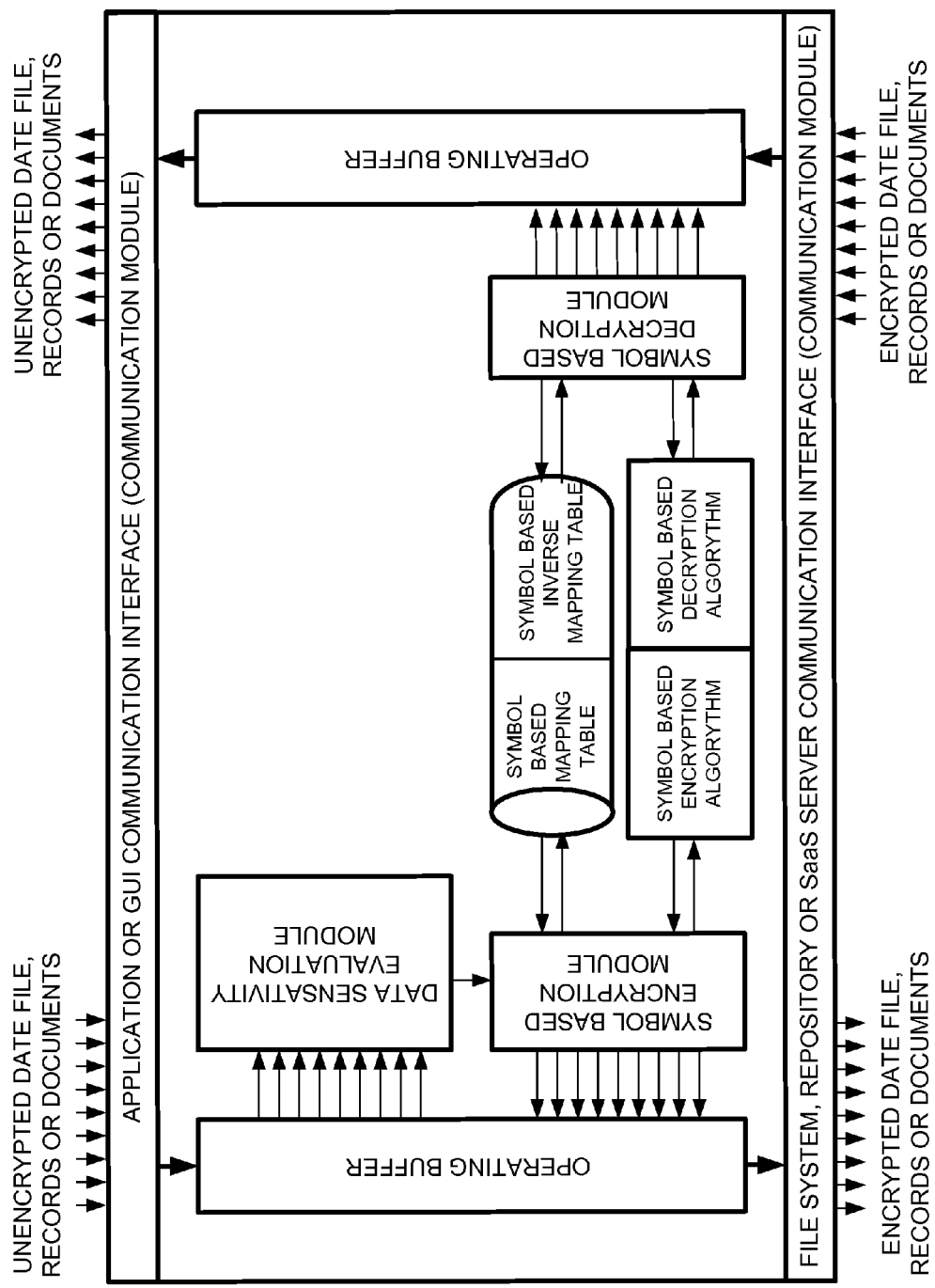
FIG. 1 is a block diagram of an exemplary data processing system according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Furthermore, it should be understood that any topology, technology and/or standard for computer networking, known today or to be devised in the future, may be applicable to the present invention.

GENERAL EMBODIMENTS

The present invention is an appliance, a system, a method and corresponding software components for encrypting and processing data. Portions of the invention may be described in view of FIG. 1 which is a block diagram of an exemplary data processing system according to some embodiments of the present invention. According to some embodiments of the present invention, there may be provided a symbol based encryption module adapted to encrypt a data file, a data record, a data transaction of a document on a per symbol basis, wherein the term symbol may be defined as a letter, a word, a phrase, a number or any set of characters including alphanumeric characters in any known language. The terms data file, data record, transaction and document may be used interchangeably throughout this application.

According to some embodiments of the present invention, a symbol based encryption module, and other associated software components, may be implemented anywhere along a data generation/processing/storage chain. According to an embodiment, the module may be integral or otherwise functionally associated with a computational platform on which an application (e.g. plug-in or add-on) used to generate or process the documents (e.g. web browser running the client side of a web application) runs. When the document is sent by the client-side application to the server-side application for further processing and/or storage, it may be automatically symbol based encrypted as part of the sending process. According to some embodiments of the present invention, some or all of the functionality of the encryption module may be executed on or using a removable peripheral (e.g. USB device), where the peripheral may include data storage and encryption logic.

According to some embodiments, the encryption module may be integral or otherwise functionally associated with an organization's file system or document repository (e.g. document management system running on an organization's server), such that all documents stored on the repository are encrypted as they enter the repository. According to yet further embodiments of the present invention, the symbol based encryption module may be integral or otherwise functionally associated with an organizational gateway to an external file system or document repository (e.g. document management system running on a third party server) provided by a document repository services provider (e.g. google, Iron mountain, etc.). According to yet further embodiments of the present invention, the symbol based encryption module may be integral or otherwise functionally associated with an organizational gateway to an application provided as software as a service provided by a software as a service provider.

According to embodiments of the present invention where the encryption module is associated with either a data and/or application server or with a gateway to an external data and/or application server, the module may be functionally associated with a communication module adapted to receive and send network data traffic (e.g. a network proxy). The communication module may include networking hardware and network protocol logic (e.g. TCP/IP stack) adapted to receive and transmit data using any network standard known today or to be devised in the future.

According to embodiments of the present invention, the encryption module is associated with networked application adapted to process data files, records, transactions, data records or documents. The encryption module may thus be functionally associated with a communication module adapted to receive and forward network data traffic to the networked processing application. The decryption module may also be functionally associated with a communication module adapted to receive network data traffic from the networked processing application.

As part of the encryption module's operation, the module may utilize a mapping table to map each of some or all of the symbols (e.g. words, phrases, numbers, etc.) in a document into one ormore corresponding cipher symbols defined by, mapped or otherwise associated with the mapping table. According to further embodiments of the present invention, a cipher symbol corresponding to an original symbol (i.e. symbol in the original non-encrypted document) may be uncorrelated and may have a different meaning than the original symbol. According to embodiments, the mapped symbol may have no meaning whatsoever. A possible implementation of the symbol table can be via an encryption algorithm. Another possible implementation of the mapping table can be by generation a random permutation from an identity permutation using a pseudo random generator.

According to yet further embodiments of the present invention, each user and/or organization may be associated with a different and substantially unique mapping table. In case the mapping table is implemented as an encryption algorithm, each user and/or organization may have a unique encryption key. In case the mapping table is a random permutation generated using a pseudo random generator each user and/or organization may be associated with a unique key to initialize the pseudo random generator. The mapping table may be a dynamically updatable table and may be enhanced/updated during operation. For example, when a user/organization starts using an encryption module according to some embodiments of the present invention, the mapping table for the given user/organization may including mappings for a set of symbols likely to be found (e.g. statistically often used) within documents used by the user/organization. When during operation, however, the encryption module identifies a symbol in a document to be encrypted, which identified symbol does not have a corresponding mapping entry in the mapping table, the encryption module or another associated software component may generate (for example, by using a random symbol generator, or by using an encryption algorithm) a corresponding cipher entry and may update the mapping table accordingly. Thus, a mapping table used by a user or organization may grow as the body of documents encrypted by the user/organization grows.

According to some embodiments of the present invention, the functionality of the mapping table may be replaced or augmented with a symbol based mapping/encryption algorithm. Any persistent symbol based algorithm known today or to be devised in the future may be application to the present invention.

According to some embodiments of the present invention, a transaction, a data record, a data file or a document to be encrypted may first be analyzed in order to determine which data/symbols within the transaction, file, record or document should or shouldn't be encrypted. There may be provided a data sensitivity evaluation module integral or otherwise functionally associated with the encryption module, which data sensitivity evaluation module may estimate or determine a sensitivity level of some given data (i.e. symbol of group of symbols) and may indicate to the encryption module whether or not to encrypt the given data/symbol(s). The higher the sensitivity level of the given data, the more likely it will be encrypted. The data sensitivity evaluation module may be adapted to detect and classify the sensitivity level of some or all symbols or groups of symbols of a data file/record/transaction/document (for example peoples' names, addresses, account information, etc.) based the symbol(s) data format or other characteristics such as the context of the symbol within the application. According to further embodiments of the present invention, certain data/symbols in a file/transaction/record/document may be metadata tagged with an indicator indicating the sensitivity level of the data/symbol, and it may be associated with it's the data's or symbol's meaning within the application. According to yet further embodiments of the present invention, there may be provided templates or configuration files associated with each type of data file/documents or applications like web applications and SaaS applications, which templates of configuration files may indicate to the evaluation module data/symbol characteristics or parameters of data/symbols found in the file/document type to be classified as sensitive, according to their meaning within the application.

According to yet further embodiments of the present invention, an encryption module's decision as to whether or not to encrypt a given data/symbol may be influenced by an indication (e.g. user defined) of a security level for the entire file or document or application. Accordingly, the same data/symbol considered sensitive and in need of encryption when found in a document or application classified as having a high security level may be considered non-sensitive, and thus not encrypted, when found in a document having a lower indicated security level.

According to some embodiments of the present invention, utilizing a mapping table may result in an invariant encryption (i.e. preserving functionality) of some or all of a document's encrypted data/symbols. Accordingly, some or all of the functionality (e.g. textual search, arithmetic operations) of a remote service, server and/or application based, may be preserved and applied to the data while encrypted, even when the encrypted data file/document is saved on a remote repository server or are processed by a Software as a Service application. For example, a document search engine or utility according to the present invention may scan through a set of documents encrypted according to embodiments of the present invention and may search for one or more search terms by: (1) first converting the search terms (i.e. symbols) referencing the same mapping table as used to encrypt the documents, and (2) then running a search of the documents based on the converted symbols. A search engine/utility according to embodiments of the present invention may be integral or otherwise associated with a computational platform on which the application used to generate and/or process some or all of the data files or record files or documents run. According to further embodiments of the present invention, the search engine/utility may be integral or otherwise functionally associated with an organizational transaction/record/file/document repository or an organization gateway to an external transaction/record/file/document repository. According to some embodiments of the present invention, the search engine/utility may be adapted to scan through a transaction/record/file/document indexing data structure maintained by a transaction/record/file/document repository.

According to yet further embodiments of the present invention, an encryption engine may be used to encrypt some of the fields of a relational database record. Accordingly, the functionality of data processes relating to encrypted and unencrypted fields (e.g. indexing of and cross referencing key fields) may be preserved.

According to further embodiments of the present invention, there may be provided a symbol based decryption module adapted to use a symbol based mapping table when decrypting transactions/records/files/documents encrypted according to some embodiments of the present invention. A decryption module associated with a given encryption module may be adapted to either use an inverse mapping table relative to the mapping table used by the encryption module or to perform a reverse lookup on the same mapping table as the one used by the encryption module. In case the encryption module was utilizing an encryption algorithm than the decryption module would use the associated decryption algorithm. Upon retrieval of the encrypted data, and/or data which is the result of a manipulation of the encrypted data by the remote service, server and/or application, the symbol based decryption module may be adapted to decrypt the one or more cipher symbols by utilizing the inverse of the mapping table that was used for the encryption or the decryption algorithm associated with the encryption algorithm which they are a result of, into their corresponding 'clear' symbols prior to output/presentation to the user.

According to some embodiments of the present invention, the symbol based encryption/decryption modules may be functionally associated with applications including word processing applications, accounting and financial applications, HR applications, email applications, spread sheet applications, calendar management applications, CRM applications, etc. According to further embodiments of the present invention, the symbol based encryption/decryption modules may be functionally associated with "Software as a Service" applications provided by third parties over the internet or other distributed data networks.

Software as a Service ("SaaS") Related Embodiments (PrivateSaaS)

Embodiments of the present invention relating to SaaS are described below, in view of attached FIGS. 2 through 6. It should be understood that although the below description relates to SaaS implementations, any novel feature described may apply one of numerous other embodiments and implementations of the present invention. The below descriptions are exemplary in nature, and nothing written therein should be interpreted to limit a general embodiment of the present invention. Any novel feature or combination of novel features described herein may constitute a claimable invention in and of itself.

According to some embodiments of the present invention, the usage of external resources such as 'Software as a Service' (SaaS) applications and cloud computing services, while confidentiality and privacy of the user/corporate sensitive data is ensured may be enabled. According to some embodiments of the present invention, the invariant encryption technology may enable for partial or full usage of SaaS application's features, while substantially maintaining user/corporate privacy and confidentially. According to further embodiments of the present invention, little or no need may exist to change the SaaS applications; the invariant encryption scheme may further enable the user to use the SaaS functionality while his data is kept in an encrypted format. Such Saas applications may include, but are in no way limited to, textual search on the data stored with the SaaS provider and arithmetic operations on numeric elements. According to further embodiments of the present invention, it may further enable the detection and decryption of encrypted elements on various formats of documents as well as in various protocols (e.g. SMTP, HTTP) and may thus enable for transparent functionality to the user.

According to some embodiments of the present invention, by use of one or more devices that "understand" the application protocol, a selective invariant encryption of substantially only sensitive data elements may be done. Sensitive information elements may be detected in the application data to be sent to the SaaS provider. According to further embodiments of the present invention, the device(s) may encrypt such sensitive elements before they are sent to the SaaS provider. As a result the application data that is sent to the SaaS provider and that resides on the SaaS provider servers may not contain any sensitive data in non-encrypted format. Accordingly, in the event of a leakage of the SaaS provider data records, the exposure user/enterprise sensitive data's and its possible misuse may be prevented. According to further embodiments of the present invention, when the user retrieves the application data via the device(s), the device may detect the encrypted elements in the application data, and decrypt them. Thus, the application data received by the client side application and/or presented to the user may be in non-encrypted-format/cleartext.

Examples for Use Cases:

According to some embodiments of the present invention, a user/corporate may use a SaaS email (e.g. gmail) FIG. 1. The information contained in emails may contain sensitive and private data that should not be exposed to anyone except the user/corporate-users. In order to prevent any exposure of this data, the device(s) may detect the sensitive data in the email and encrypt these sensitive data elements in the email before the email is sent outside of the user/corporate network to the SaaS email system. Accordingly, the email residing on the SaaS email servers, may not contain any sensitive information in non-encrypted/clear-text, and even if there is a leakage of emails from the SaaS email servers, there is no exposure of user/corporate sensitive information. When the email is retrieved by the user or by a user in the corporate network via the device(s), the device(s) may decrypt the encrypted elements in the email and the user may view the email as plain text without any encrypted content.

According to some embodiments of the present invention, the above encryption/decryption process of the sensitive data elements may be done in a transparent way from the SaaS email application perspective with substantially all its application functionality remaining as is. According to further embodiments of the present invention, the user may, for example, search in the emails stored in the SaaS email system for regular and/or sensitive data elements, and since the encryption may be done in a way that is invariant to the SaaS email application, the results of the search may be the same as those that would be obtained in a regular, non-encrypted data, search. In order to achieve this transparency from the SaaS email application perspective the device may detect sensitive data elements in the search request/query, and encrypt them, in the same way it encrypts the email content. Thus, the SaaS email search functionality may remain unchanged.

Figure 2:
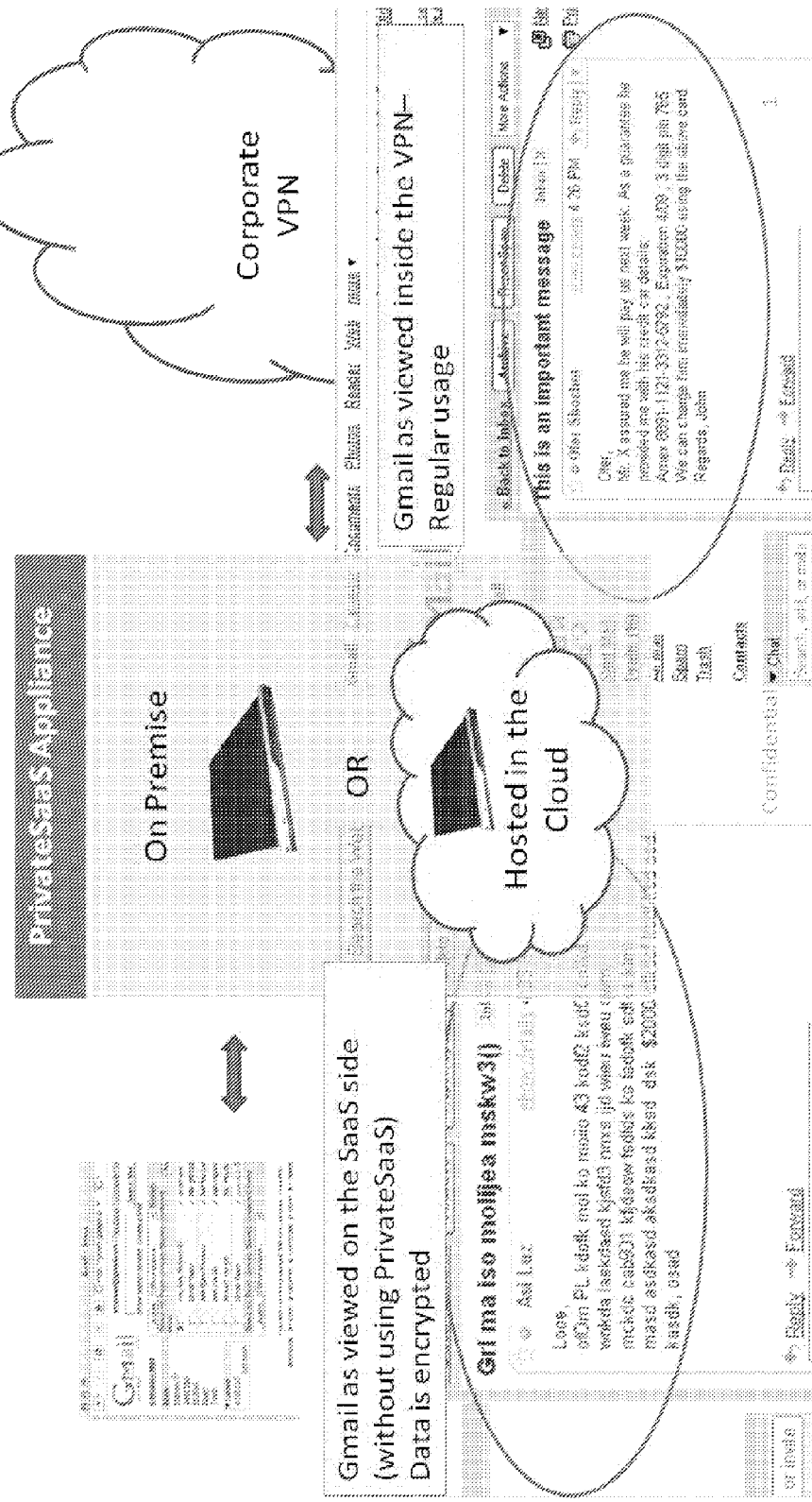
Figure 3:
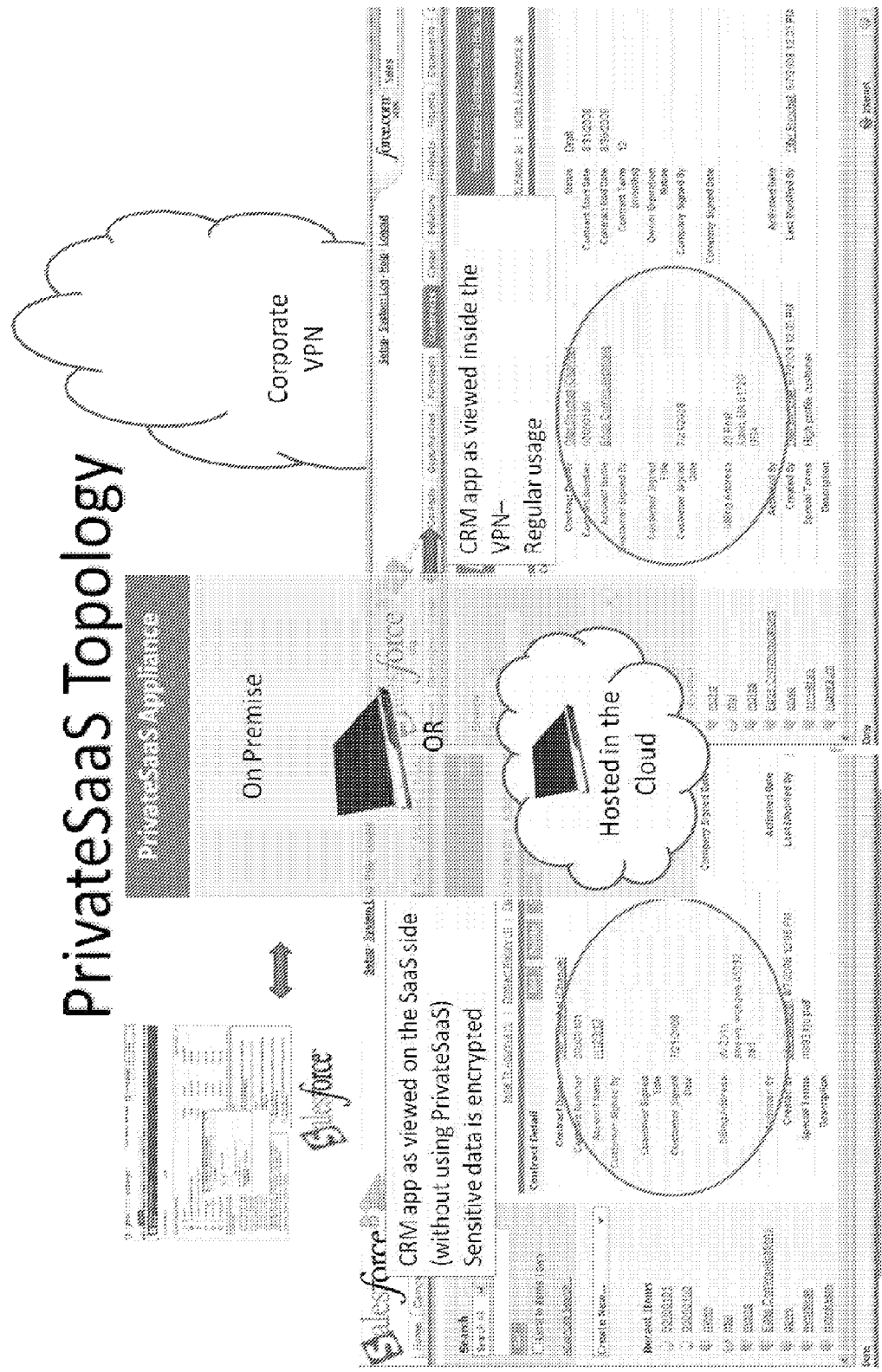
Figure 4:
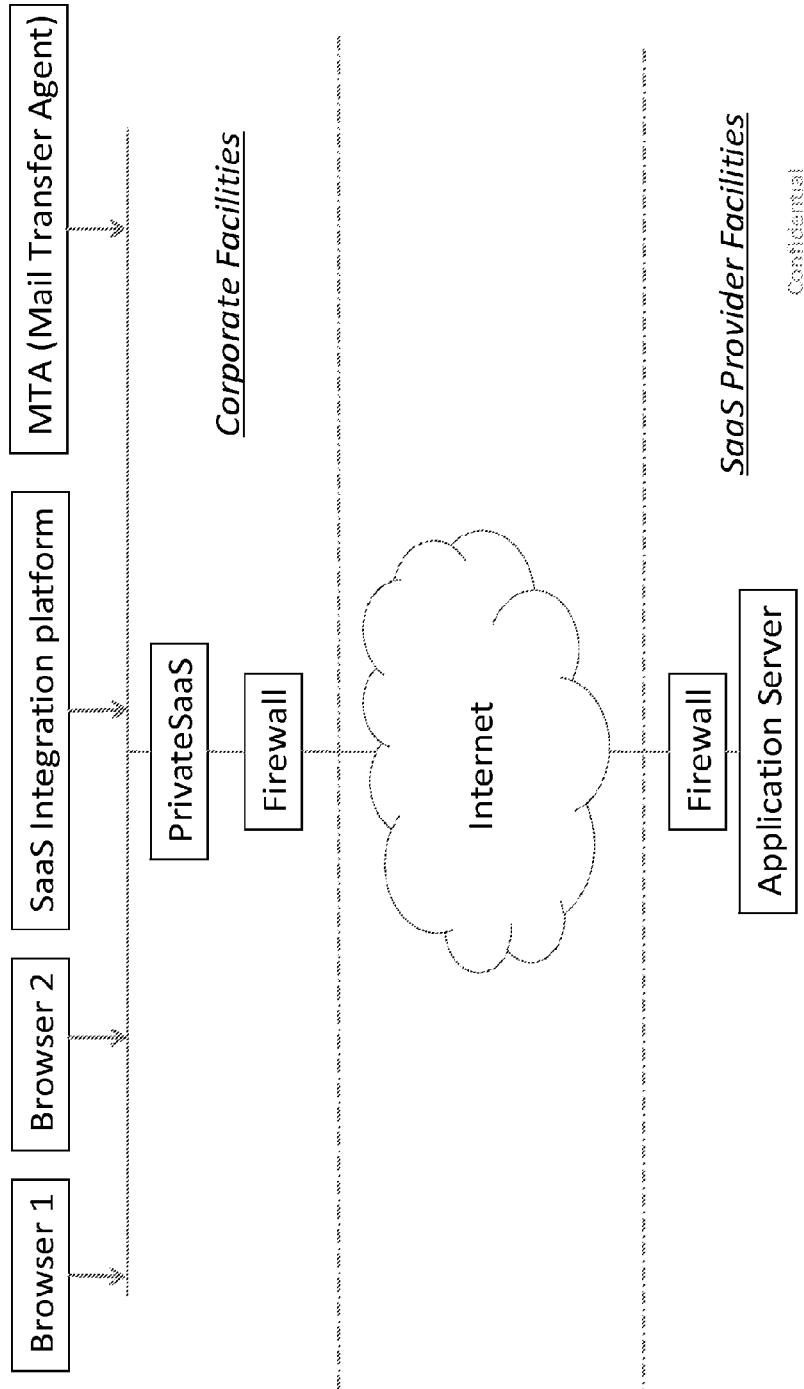
Figure 5:
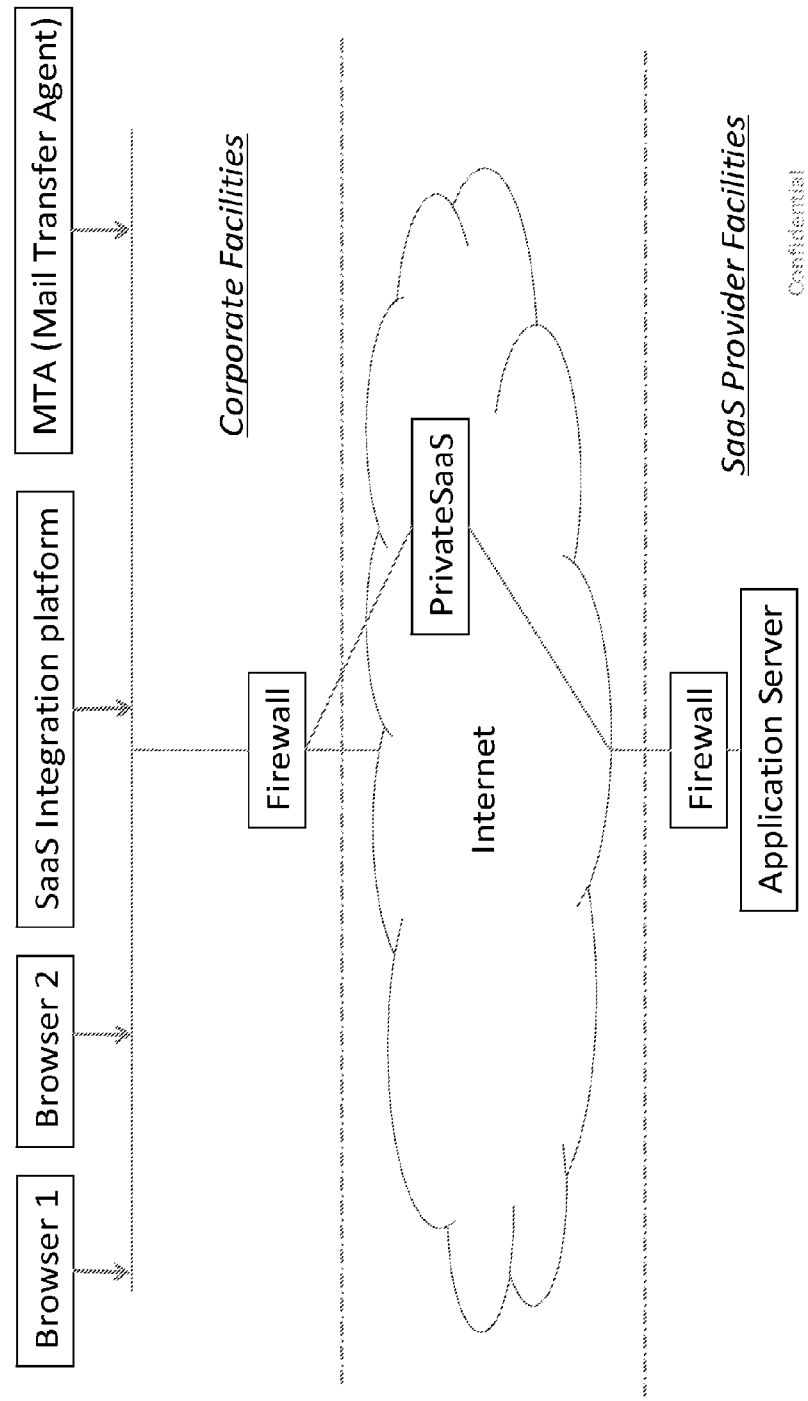

According to some embodiments of the present invention, a substantially similar principle may apply to other SaaS services such as a Web-Store, or a web application (e.g. salesforce.com) FIG. 2. When data sent to the web-application servers contains sensitive data elements, the device(s) that "understands" the web-store application's protocol may detect sensitive data elements in the HTTP requests sent to the web-store application, and may, in response, encrypt these elements. Thus, the HTTP request structure may remain substantially identical, with optionally only the value of the sensitive data elements replaced with their respective encrypted elements. Thus, the web-application may process the request as a normal request, and only the values of the sensitive data elements may be stored in the web-application databases in an encrypted format. Accordingly, even if there is a leakage of information from the web-store server-side applications and databases, there may be no exposure of user/corporate sensitive information.

According to some embodiments of the present invention, when the user is retrieving a web page that contains an encrypted element, the device(s) may detect the encrypted element(s) in the web page returned by the web-application and may decrypt them. Thus the web page received by the user/user-browser may contain a non-encrypted/plain-text response page, and all the information presented to the user may be in clear text.

According to further embodiments of the present invention, a user requesting to export the data stored in a web-store to any text based file (e.g. a word document, an excel document) the returned text file may be processed by the device(s) in order to Invariant Encryption Scheme According to some embodiments of the present invention, an SaaS application's functionality may be preserved, through encryption of substantially only sensitive elements that may not affect the application's functionality, further, the encryption of sensitive data elements may be done in a transparent way from the SaaS application perspective, in order to prevent substantially any need for changes in the SaaS application.

According to some embodiments of the present invention, the device(s) may encrypt each symbol (e.g. word/phrase) in a data element by itself asto enable the functionality (e.g. search) on each word/phrase. This encryption may be done, for example, using the Advanced Encryption Standard (AES) encryption algorithm in an ECB (Electronic Code Book) mode. In order to search in the text stored on the SaaS provider servers, the device may encrypt the search symbol/word/phrase. As a result, if the search symbol/word/phrase exists on the SaaS provide storage, the SaaS provider search mechanism may find it. According to further embodiments of the present invention, even if the information is stored on the SaaS provider storage is partially in clear text, and partially encrypted, as may be the case in certain migration phases, this mechanism may still work, as the device may modify the search phrase to search for both the clear text value and the encrypted value. Since the search phrase is not saved by the SaaS application provider, there is no damage to the security of the system from this approach.

According to some embodiments of the present invention, in some or all cases, textual sensitive data elements may not be used for any analysis, and as a result, their encryption may not affect the SaaS application functionality. For example, in a Customer Relationship Management (CRM) application, the name of the customer who made the call may not be important to analysis of the call center, thus, the fact that it is encrypted may not prevent any analysis done by the CRM application. In contrast, the call duration, and the waiting time may be necessary for the analysis and may accordingly be left not encrypted as they may be considered non-sensitive data elements.

According to further embodiments of the present invention, function specific data encryption (persistent ver. transient): may be used in order to enable auto-complete functionality. Since the values, in this example, are not stored at the SaaS provider, but rather only used to perform a search in the SaaS application dictionary, the device(s) may "understand" that the request is an auto-complete request, and may accordingly, not change the value, thus preserving the SaaS application functionality.

The Encryption of Textual Data Elements

According to some embodiments of the present invention, the encryption of textual elements may be achieved by performing the following exemplary process:

To begin with, the data element will be divided to words. Each word will be encrypted by itself (this is done to enable the search of a single word inside the value of a sensitive data element).

In case the word binary representation is less than 121 bits than it will padded with zero to obtain 121 bit.

The first 7 bits will define the number of bits in the word representation

These 128 bit are encrypted using the AES algorithm (e.g. Federal Information Processing Standard—(FIPS 197)) with the device secret key as the key, and the 128 bit representing the word as the input.

The output of the AES algorithm is 128 bit which coded using base 64 encoding to obtain a textual output.

To the base-64 encoded value we add a one/two character prefix and one/two character suffix in order to ease the detection to the encrypted word in a textual string received as response from the SaaS application server. (Note: the addition of prefix and suffix is optional since the format of 22 alpha numeric characters (the output of base-64 encoding on 128 bit) is unique by itself.

In case the word binary representation is more than 121 bit than it is padded with zero to the smallest multiple of 128. The first 7 bits will define the number of bits in the word representation in each of the consecutive 128 bit representations.

The result which is a multiple of 128 is encrypted using the AES algorithm (FIPS 197) in Cipher Block Chaining (CBC) mode, with the device secret key as the key, and the multiple of 128 bit as the input.

The output of the AES algorithm is multiple of 128 bit which coded using base 64 encoding to obtain a textual output.

To the base-64 encoded value we add a one/two character prefix and one/two character suffix in order to ease the detection to the encrypted word in a textual string received as response from the SaaS application server. (Note: the addition of prefix and suffix is optional since the format of 22 alpha numeric characters (the output of base-64 encoding on 128 bit) is unique by itself According to further embodiments of the present invention, In order to avoid the encryption of repeated words, the device may use a hash function to calculate the hash value of the word and maintain a hash table of words that have already been encrypted; the value in each entry may be the encrypted word. Thus, before a word is encrypted the following exemplary process may be performed:

The device is calculating the hash of the word

The device is querying to the hash table to check in the hash value exist in the hash table If the hash value exists in the hash table, than the value in the hash table entry is used as the encrypted word If the hash value doesn't exist in the table, than the word is encrypted as defined and an entry for the hash value is created in the hash table, with its value being the encrypted word.

According to further embodiments of the present invention, in order to optimize the performance of the decryption phase, for each encrypted word its hash value may be calculated and entered into a second hash table of encrypted words. The value of the entry in the encrypted words table may be the value of the plain-text word associated with the encrypted word.

Thus, in the decryption phase following exemplary process may be performed:

The decryption module is searching the response (which is in textual format) for encrypted words, using a regular expression that define the encrypted words (as we explained above, the encrypted words have well defined alpha numeric structure).

When an encrypted word is detected, the decryption module first calculates the encrypted word hash value and uses it to search in the encrypted word hash table.

If the encrypted word hash value is found in the encrypted words hash table, than it extracts the plain text value form it.

If it is not found in the hash table, than the module, decrypt the encrypted word using the following exemplary process:

Decode the base 64 encoded value into a 128 bit (or a multiple of 128 bit)

Decrypt the 128 bit value using the AES algorithm and the device secret key

According the number of bit that appear in the first 7 bits, we know how many bits should be used from the decrypted bit string.

The relevant bits are translated into ASCII characters to obtain the plain text word.

Handling Case Sensitivity

According to further embodiments of the present invention, in cases such as a search operation the operation maybe required to be case insensitive. To ensure that the invariant encryption is translating both the text as well as the search terms into lower case. This may ensure that the search will be case insensitive. In order for the decryption of the text to preserve the case sensitivity of the original text (e.g. word), the device(s) may memorize which character is upper case and which is lower case in a bit vector that is added as an additional word after the encrypted word.

According to further embodiments of the present invention, when the device is encrypting the word, it may generate a bit vector that contains 1 for the upper case letter characters and 0 for lower case letter characters, digits and/or additional characters. The number of the bits in the bit vector may correspond to the number of characters in the word, and the bit string may be padded with zeros for 64 bit encoding. The 64 based encoded bit vector may be added after the encrypted word.

According to further embodiments of the present invention, when the device(s) is decrypting a word as described above, it may also decode the 64 based encoded word that is adjusted to the encrypted word, and according to the 1's in the decoded bit vector the appropriate letters may be set to upper case letters.

Encryption of Email-Addresses

According to some embodiments of the present invention, case of an email address, in order to preserve the structure of the email address, the device may encrypt each part of the email address by itself, and may maintain the structure of the email address. According to further embodiments of the present invention, the device may divide the email address to the user-name and the domain-name, i.e. user-name@domain-name.com (or any other suffix e.g. .co.il). The module may encrypt the user-name by itself and the domain name by itself and may recompose the new email address using the encrypted values of the user-name and the domain-name.

According to further embodiments of the present invention, the detection may be done by a regular expression such as encrypted-valueencrypted-value. The decryption module may decrypt each of the encrypted values, and recompose the email address using the plain-text values for the user-name and the domain-names.

Format Constraint Data Element Encryption:

According to some embodiments of the present invention, in cases where the application required that the format of the sensitive data elements will be preserved, for example in case of a zip code or a telephone number, the device may build a permutation on the legal values and use the permutation for encrypting the sensitive data element, and the inverse permutation for the decryption of the data element.

According to further embodiments of the present invention, the permutation used may enable for a search on these values to be performed, whereas the values of these elements are not usually used for numerical calculations.

The Generation of the Pseudo Random Permutation:

According to some embodiments of the present invention, an exemplary algorithm that may generate a permutation of n items uniformly at random without retries, known as the Knuth shuffle may be used, it starts with the identity permutation or any other permutation, and then go through the positions 1 through n−1, for each position i swap the element currently there with an arbitrarily chosen element from positions i through n, inclusive. It's easy to verify that any permutation of n elements will be produced by this algorithm with a probability of 1/n!, thus yielding a uniform distribution over all such permutations. (see http://www.techuser.net/randpermgen.html)
(Note: The inverse permutation is computed by exchanging each number and the number of the place which it occupies.)

According to further embodiments of the present invention, the device may use this algorithm to generate the secret permutation wherein the random elements may be chosen using a pseudo random bit string that may be generated using the AES algorithm in CBC mode with the device secret key as the key for the AES algorithm and a predefined initial vector.

Encryption for Zip Codes:

According to some embodiments of the present invention, in case the ZIP code is 5 digits and it is required to preserve the zip format, the encryption module may use a pseudo random permutation on the values in the range 00000-99999 to encrypt the zip codes and the inverse permutation to decrypt the zip codes.

According to further embodiments of the present invention, the encryption may be done by referencing the permutation with the zip code to be encrypted and the value of this cell in the permutation is the encrypted zip code. The decryption may be done by referencing the inverse permutation with the encrypted zip code and the value of this cell in the inverse permutation is the original zip code Encryption of Social Security Numbers (SSN)

According to some embodiments of the present invention, in the case of the encryption of a SSN credit card number, the structure of the SSN should be preserved. Accordingly, the following exemplary process may be performed:
  encrypt the first 5 digits using a permutation on 00101-74099
  encrypt the last 4 digits using the permutation on 0001-9999

Each of the permutations as well the corresponding inverse permutations may be calculated as explained above.

Encryption of Credit Card Number:

According to some embodiments of the present invention, in case of the encryption of a credit card number, the structure of the credit card number should be preserved. Accordingly, the credit card number may be divided into four 4-digit groups and each group may be encrypted using a permutation on the number 0-9999 (a different permutation for each group or the same permutation for all the groups may be used).

The process of generating the pseudo random permutation is explained above.

According to further embodiments of the present invention, if one of the 4 digit groups has only 3 digits, a zero digit may be added to it to make it a 4 digit group. Furthermore, in cases where there is a need to preserve the check digit, the module may apply the transformation to all the digits except the last digit, and may then calculate the last digit according to the known algorithm for the last digit.

Notes: since there may be no distinction in the format between clear text credit card number and encrypted credit card number, and if the server side application is not checking the check digit Encryption of Dates:

According to some embodiments of the present invention, the encryption of dates may preserve the format of date such as DD-MM-YYYY, when the only restriction is that it will contain digits, date may be translated, for example, into a value between 0-31*12*100 (0-37200) and a permutation on the values on this range may be used.

According to further embodiments of the present invention, when the server side may perform statistic calculations per year, the year may be preserved by itself, a permutation may be applied on DD-MM by itself and on the year by itself. (Note: the Health Insurance Portability and Accountability Act (HIPAA) requires that the day and moth will be secret but the year can remain in plain text).

According to further embodiments of the present invention, when the server side may perform statistic calculations per month, the month may be preserved by itself, a permutation may be performed on the day by itself, on the month by itself and on the year by itself.

Numeric Data Element Encryption:

According to some embodiments of the present invention, in order to enable the SaaS application to make numeric analysis on sensitive numeric values (such as salaries) the device may apply a reversible numeric transformation on these values. (This numeric transformation may depend on the device secret key). Thus, the application may perform the analysis on the transformed numeric values. When the transformed values or any value calculated are returned by the application, the device may apply the inverse transformation on these values, and thus, the numeric values presented to the user may be the real numeric values.

Transformation on Numeric Values:

According to some embodiments of the present invention, In order to enable arithmetic operations on the numeric fields, such as, but in no way limited to, revenues, salaries; an arithmetic transformation on these values may be performed. A possible arithmetic transformation may be multiplying by a secret constant. The advantage of this transformation is that its inverse is simply multiplying by the inverse of the secret constant. (Note: the transformation of multiplying by a secret constant and adding a secret constant may not be used, since when the values are added, we do not know how many elements have been added and may not apply the inverse transformation).

According to further embodiments of the present invention, multiplying transformation may maintain the numeric order between the numeric values preserved, e.g. the largest salary remains the largest salary, however, since the device has encrypted the employees' names, we may not know who it is, and we may not know what the real salaries are. Thus substantial confidentiality may still be achieved.

According to further embodiments of the present invention, in order to provide further security to numeric values integration with the server side application may be required. If such integration is possible than the server side apmay communicate with a component of the present invention that may decrypt for it numeric data that is encrypted in a similar way to the textual data. The server side application may perform the arithmetic calculations on the decrypted numeric data, and may then encrypt the final result using the component of our solution. This component may reside at the server-side and may securely communicate with the device on the enterprise for key management, thus it may enable the application to continue to function normally, while providing substantially high security encryption to the numeric data.

Per-Application Privacy Policy

According to some embodiments of the present invention, since the usage of each application may be different and the meaning of different fields may be different in each application, the device may have a different encryption-policy for each SaaS application. Thus, for certain functionality the device may have to be familiar with the SaaS application protocol. (Note: The knowledge on the protocol may be gathered by an off-line process). For example, a file that is attached to an email may be encrypted as one entity to achieve additional security, and only the name of the file should be encrypted using the invariant encryption scheme. However, for Google docs application we each data element in the document should be encrypted as to preserve the Google docs functionality. In addition, Google Apps provides a very detailed Application Programming Interface (API) that enables developers to develop their own applications on top of Google Apps services. This APIs which defines the meaning and the semantic of each parameter in each Google application, enables the preparation of a detailed policy for each Google application, and for each application developed on top of Google APIs since the device may intercept the calls to the APIs and may apply the privacy policy to the parameters according to the application, the requested APIs, and the policy security level (e.g. basic security, high security and top-secret).

According to further embodiments of the present invention, and as another example, in case the SaaS application is performing a format validation at the server side, an invariant scheme that preserves the data element format may be used. However, if the format validation is done on the client side, then the device can use an invariant encryption scheme that doesn't preserve the format which may be more secure and more efficient to implement.

Policy-Driven Privacy Enforcement:

According to some embodiments of the present invention, as each organization may have its own privacy policy, the device may enable the enterprise to define which type of security policy to use (e.g. basic security, high-security, top-secret), and to fine tune each type of security policy as to address the enterprise privacy and confidentiality requirements. For example, for an organization that requires meeting HIPPA regulations, dates will be encrypted in a way that eliminates day and month and leaves the year value unchanged while other organizations may leave all dates untouched.

Automatic Building of Application's Privacy Policy

According to some embodiments of the present invention, in order to handle unknown applications and unknown changes in applications substantially without need for human intervention, the device may apply an automatic policy for unknown parameter. The device may classify currently unknown parameters according to their names and/or their data format (e.g. non-sensitive, sensitive, highly-sensitive). For example, if the parameter name is email-address or any similar parameter name and the format of the value of the parameter is an email address than the device is classifying it as an email address and according to a pre defined configuration email address is defined as sensitive. As another example, if the parameter name is phone number or any similar name and the value matches a generic phone number regular expression, than the parameter is classified as phone number. However, is the parameter name is call duration and the format matches a time period regular expression, than it is defined as call period which for CRM application is defined as non-sensitive. This classification of these new parameters may be stored in the device and may be checked on subsequent appearances of the parameter in the request, after enough occurrences it may be determined automatically by the device.

According to further embodiments of the present invention, the handling of a parameter may depend on its classification and on the security level defined for the application. For example, in basic security policy only highly sensitive parameters may be encrypted whereas sensitive parameters may be encrypted only if the level of confidence that the encryption will not cause any undesired effect is substantially high. However, for top-secret policy both sensitive and highly sensitive parameters may be encrypted.

According to further embodiments of the present invention, this mechanism may enable the device to handle applications without prior knowledge on the application and to build the privacy policy on the fly according to the application usage. It may also enable the device to handle changes in the application such as a new parameter, by classifying the parameter as it is being used.

Auditing & Monitoring of the SaaS Usage:

According to some embodiments of the present invention, in addition to the encryption/decryption done by the device, the device may also monitor and audit the usage of the SaaS application by the enterprise users. Some exemplary reasons may include:

1. Preventing leakage of sensitive information that should not be sent to the SaaS provider. For example, the enterprise policy is that the credit card numbers should not be stored in the SaaS CRM application, and once the users are entering a credit card number as part of the call description, the device will detect this sensitive element in the call description and will mask it according to the company policy.
2. In case there are certain functionalities that should not be available to all the users in the enterprise, the device may be able to enforce an authorization/access-control policy on the usage of the SaaS application.

In addition, to benefits of monitoring and auditing from the security perspective, the device may monitor factors such as, but in no way limited to, the availability and the response time of the SaaS application.

Principals of the Device Operation:

According to some embodiments of the present invention, the device may function as a proxy between the SaaS application client (usually running in the end user browser) and the SaaS application server side, running on the SaaS provider servers. As a proxy it may monitor the traffic (e.g. requests and responses) between the SaaS application client side and the SaaS application server side. The device may detect the application according to the domain name in the request. According to the URL the device may detect the request type, and according to the request type, it may "know" what sensitive data elements that should be encrypted are included in the request. Since the requests may be HTTP requests, or other requests using key value pairs, the device may detect the relevant parameters by their names, and may replace their value in the request with the encrypted value. In case it is a post request (e.g. with a XML body), the device may use a parser (e.g. XML parser) to query and extract the value of the sensitive data elements and replace their plain-text values with the encrypted values.

According to further embodiments of the present invention, in order to enable the detection of the textual encrypted values in the response, the device may add a prefix and a suffix to each encrypted element (as will be explained later). In case a textual search encryption is detected, the device is detecting the textual text request, and may apply the same encryption to search terms in order to preserve the server side search functionality.

The same principal may be applied to sensitive numeric data elements that are encrypted using a numeric transformation. When a numeric search is performed on these numeric data elements the device may detect the numeric search request and may replace the values with the transformed values.

According to further embodiments of the present invention, when the response is returning from the SaaS application, it is may be a web page. In order to ease the detection of textual encrypted elements, each encrypted element may have a unique prefix and suffix. The device may is use these prefix and suffix as to detect the textual encrypted elements in the web page and replace them with their clear text values. The same may apply to XML documents that returned as a response or to textual files and documents that are downloaded from the SaaS provider server.

According to further embodiments of the present invention, in order to decrypt numeric value or format constrained values which may not have a prefix and suffix, the device "knows" where these values appear in the response, i.e. the device contains a pattern that may be used for a pattern matching to detect the value. The device may apply these patterns to the response to check if they contain encrypted values, and if encrypted value are detected their value may be transformed (e.g. using the inverse transformation or the inverse permutation), and the transformed values may be placed inside the response. Thus, the response received by the browser may contain only plain text.

The Device Position in the Corporate Network:

According to some embodiments of the present invention, the system may be embodied in a networked computational platform of device, for example as a proxy between the client side application running usually at the user's browser and the application server side running on the SaaS provider servers. FIGS. 3 through 6 show various exemplary topologies which may be used.

In case of a corporate network it may make sense to position the device in the corporate network perimeter close to the firewall. The advantage of this position is that only users that work within the enterprise network can work with the application normally and any users that are not passing through the device may view only the encrypted data elements. This may enable the enterprise to audit the access to the application, and prevent any unauthorized access to the application from outside of the corporate network, even if the user has somehow a username and password to the application.

According to further embodiments of the present invention, this topology may handle scenarios of an ex-employee that has left the organization, but for some reason was not deleted from the SaaS application users list. This topology may also handle the scenario where somehow a username and password of the application were revealed to an unauthorized user outside of the enterprise.

According to further embodiments of the present invention, another advantage of this topology may be that the enterprise has full control on the device, and the device secret keys remain with the enterprise. As explained above the device may enable the corporate IT or the compliancy officer substantially full control over on the privacy policy enforced by the device.

According to further embodiments of the present invention, in order to enable remote users to work properly with the SaaS application they may need, in this topology, to connect to the enterprise network (e.g. using SSL VPN), and work though the enterprise network. This proxy may also be implemented as software running on the end-user's desktop/laptop, to address to consumer market.

Potential PrivateSaaS Appliance implementation, in accordance with some exemplary embodiments of the present invention:

The appliance will be running Linux (as its OS)
      On the Linux Apache is ran in proxy mode as our proxy server.
      The encryption/decryption module will be running as an Apache module.
    The appliance will have a web based GUI.

PrivateSaaS Web based GUI, in accordance with some exemplary embodiments of the present invention:

The web based GUI may enable the user to define the privacy policy, and to manage the device secret key. The device may comprise:

A secret key management GUI that will be available only to very minimal number of users
    Policy management GUI that will be available to Policy administrators
    For each application supported by the device will have a dedicated GUI that will be tailored to the specific application.
    The policy screen will enable the policy administrator to define which data elements are sensitive data elements.

PrivateSaaS Possible Advantages and Benefits: in accordance with some exemplary embodiments of the present invention: Following are the possible benefits provided by the innovation to its user (with the focus on the enterprise):

Provide full control of the informaiton that is sent out-side from the enterprise network to the SaaS provider (i.e. control what can go to the SaaS and what cannot), and minimize the exposure of enterprise confidential data
    Enforce the enterprise data privacy policy, and enable the compliance officer to easily define and enforce a corporate policy regarding:
      Data that can be exported externally—the security/compliancy officer can define that certain data elements (e.g. credit card numbers) should be masked before being sent out side of the enterprise (due to PCI-DSS compliancy).
      Data that should be secured—although the device provides predefined configuration of sensitive data elements for different SaaS applications, the security/compliancy officer can modified it to tailor it to the enterprise security policy.
    The innovation enable the CXO to use SaaS to reduce costs by using SaaS application without exposing confidential data and as a result without risking privacy regulations
    It allows juresdiction definition and simplify/reduce audit requirements.
    It reduces recurring compliance audit costs of SaaS solutions, and reduces the need for auditing on the SaaS provider.
    In case of any SaaS related security breach, no notification will be required to customers according various regulations (e.g. CA SB1386 (2003)).
    Monitor and Audit SaaS usage and SLA
      It enables monitoring of SaaS applications usage by the enterprise
      It enables enforcement of enterprise specific access control policy on SaaS usage by users
      It can detect abnormal usage of SaaS applications
      It monitor SaaS application availability and response time PrivateSaaS Possible Advantages and Benefits to the SaaS provider, in accordance with some exemplary embodiments of the present invention:

Enhancing attractiveness of their solution, by overcoming one of the major prospects' inhibitor which is the privacy and confidentiality of the data.
    Reducing liability in case of data exposure. Since the sensitive information is encrypted even if the information leak that is no damage. Although it will not eliminate any other security measured that should be taken by the enterprise, it is still the last defense in case all the other defense layers have failed.

User Authentication & Authorization—Additional Features of PrivateSaaS:

According to some embodiments of the present invention, an additional security feature for enterprise applications may be user authentication and authorization (i.e. access control). These security features may control who can access the enterprise application (authentication), and what functionality is available for each user (authorization). These security features may also be required when the enterprise application is provided in a SaaS model. However, when the application is provided in a SaaS model the issue of user management and user access rights management is becoming an issue, since each enterprise has to manage its own users as well as their access rights according to its policy (there is usually no general policy that can enforced by the SaaS provider). Since the PrivateSaaS usually resids within the enterprise network and is managed by the enterprise IT it may make a lot of sense that PrivateSaaS will enforce the enterprise policy for user autheand authorization.

According to further embodiments of the present invention, in order to address these requirements the PrivateSaaS appliance may integrate with the enterprise user repository (such as the enterprise LDAP or active directory), and when the user is trying to connect to the SaaS application the PrivateSaaS may first verify the user identity against the enterprise user database. If the user identity is verified the PrivateSaaS may check if the user is entitled to use the SaaS application. This check may be done against the enterprise users database (e.g. LDAP, Active-Directory or a user database) that contains the access privileges for each user, and may usually depend on the user role. Thus, PrivateSaaS may enable the security officer to define access rights rules for SaaS applications according to the user role in the enterprise. (Note: In case such a user access rights database doesn't exist PrivateSaaS may provide the ability to manage users' access rights in PrivateSaaS). In addition to enforcing access rights for each application, the PrivateSaaS may allow to manage and enforce more granular access rights, i.e. access rights to functionality within the application. These access rights may also depend on the user role.

According to further embodiments of the present invention, the above functionality may enable PrivateSaaS to enforce a privacy policy that is user dependent, i.e. depend on user role or user department. This may enable the enterprise to generate separate groups within the enterprise wherein only members from a given group may be able to read messages/ information generated by that same group and/or group of groups. For example, the enterprise may want to separate between the finance department and other departments, in order for financial information to be readable only to members within the finance group. To achieve this PrivateSaaS may use a different key for the finance group and a different key for the rest of the enterprise. Thus, only the finance group for which PrivateSaaS may use the special key for encryption/ decryption will be able to read the messages/information generated by their group.

According to further embodiments of the present invention, PrivateSaaS may also enable multi hierarchy. For example in the previous example the CEO should be able to read both the messages generated by the financial group as well as messages generated by other departments. To achieve this PrivateSaaS may use for the CEO both keys and may try to decrypt the encrypted data elements using both keys. Due to the structure of the encrypted element, PrivateSaaS can verify if the decrypted data element is clear test. Thus, for the CEO PrivateSaaS may try to decrypt the information using one key and if the decrypted element is not clear text it will try the second key. In a similar way, for a search operation it may encrypt the search term using both keys and may use an OR operation between the two encrypted search terms.

The Invention described herein illustrates some of the benefits of using the invariant encryption method for SaaS application scenarios. However, there are various additional business applications that can benefits from it, such as cloud computing and internal usage of the device within the enterprise to protect the data stored within the organization storage from any unauthorized use.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system comprising:
a symbol based encryption module adapted to encrypt on a per symbol basis some or all of the data within a data record, data file or document, wherein the encryption is invariant on a per symbol basis and at least some of the data in the file or document remains processable in a Software as a Service (SaaS) environment, and wherein search terms to be used to search the some or all of the data within the data record are converted using the symbol based encryption module and searching is performed utilizing the converted symbols within the SaaS environment, wherein symbols to be encrypted are first converted into lower case letters, encrypted, and then case format information relating to the unencrypted symbols is then encoded onto the encrypted data;
a sensitivity module communicatively coupled with the symbol based encryption module to evaluate the data to determine a sensitivity level for multiple components of the data, wherein encryption of the multiple components is performed based on the sensitivity level corresponding to the component.

2. The system according to claim 1, wherein said encryption module utilizes either a symbol based mapping table or a encryption algorithm adapted for symbol encryption.

3. The system according to claim 2, wherein the mapping table or the key for the encryption algorithm is user or organization specific.

4. The system according to claim 2, further comprising a symbol based decryption module adapted to utilize a mapping table or a decryption algorithm associated with the table or algorithm used for encryption by said encryption module, and wherein the term associated means either the same or the inverse of, or derived from.

5. The system according to claim 4, wherein said decryption module is integral or otherwise functionally associated with an application adapted to generate, view, process or edit the data file, record or document.

6. The system according to claim 4, wherein said decryption module is integral or otherwise functionally associated peripheral hardware connected to a computational platform of an application adapted to generate, view, process or edit the data file, record or document.

7. The system according to claim 4, wherein said decryption module is integral or otherwise functionally associated with an organizational data file system or record/document repository.

8. The system according to claim 4, wherein said decryption module is integral or otherwise functionally associated with a gateway to an extra-organizational data file system or record/document repository.

9. The system according to claim 4, wherein said decryption module is integral or otherwise functionally associated with an application provided as software as a service server or with a gateway to an application provided as software as a service server.

10. The system according to claim 2, further comprising a search engine/utility adapted to search one or more encrypted files, records or documents by converting search terms into encrypted versions of the search terms.

11. The system according to claim 10, wherein said search engine/utility is functionally associated with a relational database and searchable encrypted files, records or documents are stored on the relational database.

12. The system according to claim 2, further comprising a data processing module adapted to read and process encrypted and unencrypted data from one or more data files, records or documents eby said encryption module.

13. The system according to claim 12, wherein said data processing module is further adapted to read and process encrypted data from one or more data fields of files, records or documents encrypted by said encryption module.

14. The system according to claim 2, where said encryption module is adapted to encrypt at least a portion of one or more fields of a data file, record or document stored to a relational database.

15. The system according to claim 14, wherein one or more relational database processes are performed on unencrypted portions of fields of one or more files, records or documents stored on the relational database.

16. The system according to claim 14, wherein one or more relational database processes are performed on encrypted portions of fields of one or more files, records or documents stored on the relational database.

17. The system according to claim 1, wherein encryption of a symbol or group of symbols is selective and based on a sensitivity evaluation of the symbol(s).

18. The system according to claim 17, further comprising a data sensitivity evaluation module adapted to determine a sensitivity level of some or all symbols or groups of symbols within the data record, data file or document.

19. The system according to claim 18, wherein sensitivity classification of symbols is determined based on one or more parameters selected from the group consisting of symbol title, symbol data format and a user selected security level.

20. The system according to claim 1, wherein said encryption module is integral or otherwise functionally associated with an application adapted to generate, view, process or edit the data file, record or document.

21. The system according to claim 1, wherein said encryption module is integral or otherwise functionally associated peripheral hardware connected to a computational platform of an application adapted to generate, view, process or edit the data file, record or document.

22. The system according to claim 1, wherein said encryption module is integral or otherwise functionally associated with an organizational data file system or record/document repository.

23. The system according to claim 1, wherein said encryption module is integral or otherwise functionally associated with a gateway to an extra-organizational data file system or record/document repository.

24. The system according to claim 1, wherein said encryption module is integral or otherwise functionally associated with an application provided as software as a service server or with a gateway to an application software provided as a service server.

25. The system according to claim 1, wherein the data record is an HTTP, HTTPS, SMTP, IMAP, POP3, or WAP request.

26. The system according to claim 1, wherein the data record is an HTTP, HTTPS, SMTP, IMAP, POP3, or WAP related transaction.

27. A non-transitory computer-readable medium having instructions that, when executed by one or more processors, are capable of causing a data processing system to implement:
   a symbol based encryption module adapted to encrypt on a per symbol basis some or all of the data within a data record, data file or document, wherein the encryption is invariant on a per symbol basis and at least some of the data in the file or document remains processable in a Software as a Service (SaaS) environment, and wherein letter case format information is encoded on the encrypted data, and wherein search terms to be used to search the some or all of the data within the data record are converted using the symbol based encryption module and searching is performed utilizing the converted symbols within the SaaS environment, wherein symbols to be encrypted are first converted into lower case letters, encrypted, and then case format information relating to the unencrypted symbols is then encoded onto the encrypted data;
   a sensitivity module communicatively coupled with the symbol based encryption module to evaluate the data to determine a sensitivity level for multiple components of the data, wherein encryption of the multiple components is performed based on the sensitivity level corresponding to the component.

28. The computer-readable medium according to claim 27, further comprising a decryption module adapted to read the case format information from the encrypted symbols, decrypt the encrypted symbols back into lower case decrypted symbols and apply the case format information to the decrypted symbols.

* * * * *